UNITED STATES PATENT OFFICE 2,043,009

METHOD OF PRODUCING FERTILIZER AND CHARCOAL FROM WASTE ORGANIC MATTER

Gustave T. Reich, Anaheim, Calif.

No Drawing. Application October 26, 1925, Serial No. 65,039

5 Claims. (Cl. 71—6)

This invention relates to a method of producing charred products from waste organic matter, and refers particularly to a method of producing fertilizer and charcoal from cane or beet molasses, Steffens waste water or slop from distilleries.

In my copending application Serial No. 599, filed January 5, 1925, since issued September 8, 1925, Patent No. 1,552,732, there is described a method for treating waste organic mixtures and the like to manufacture fertilizer. In accordance with such process, organic products, after being concentrated, then retorted, to produce fertilizer, the process also describing certain treatments to control the quantities of nitrogen and potash which will be obtained in the final product.

The present invention is concerned broadly with the control of the retorting operation so as to effectively control the physical properties of the product. The product of the present invention is useful as a fertilizer, for feeding chickens, or as a raw material for the production of concentrated fertilizer and industrial carbons. This product will be designated in the specification and claims by the term "charred product". Depending upon the use to which the product is to be put, the charred product from the retort may be desired in dense or light form, and the product may be desired in either a hard form of considerable crushing strength, or in a form readily pulverizable or crushable to a fine powder.

It is an object of the present invention to provide a method for producing charred products from organic matter by which the density of the product can be controlled as desired and by which the hardness and texture of the final product can be brought to any desired value.

I have discovered that when, for example, cane or beet molasses slop is to be retorted to form a charred fertilizer or charcoal, the crushing strength can be materially decreased through the neutralization of the slop before the dehydration and retorting of the same. It appears that by neutralization of such molasses slop, the gums or resins present therein are destroyed upon the retorting process, with the result that a product is obtained which may be more readily crushed and broken up as desired. Moreover, it is found that the neutralizing of the molasses or slop prior to the retorting of the same operates to vary the expansion of the material upon the retorting, with the result that the density of the final product is also changed, that is, the addition of alkali to the slop operates to decrease the density of the product as well as decreasing its crushing strength.

I have discovered that the density of the desired charred product may be controlled by controlling the temperature of dehydration of the slop prior to the charring or retorting action. Thus, when the molasses slop is dehydrated at a temperature not over 120° C., it expands to only approximately double its original volume, whereas when the molasses slop is heated to a temperature above 140° C. before the same is dehydrated, the material will expand two to five times its original volume, whereas the use of temperatures from 170° C. to 325° C. will cause the material to expand approximately four to ten times respectively its original volume.

I have also discovered that the sediment formed by the neutralization of the distillery slop has a binding and retarding influence upon the expansion of the slop during the dehydrating or retorting operation.

As a consequence of the above discoveries, I have provided a process adapted to produce a charred fertilizer or charcoal having different densities as desired, and of different crushing strength.

The present invention will be more readily understood from a description of a preferred process of charring waste organic matter, which will now be described:

Waste organic matter such, for example, as cane or beet molasses slop, if desired, may be processed in accordance with the process of my copending application previously referred to in order to control the percentage of nitrogen and potash produced in the charred product.

When it is desired to reduce the crushing strength of the charred product which will be produced by the process, there is then added to the molasses slop, either before or after concentration, a neutralizing agent, such as caustic soda, sodium carbonate and the like. The agent may be added in sufficient quantities to just neutralize the acid slop in case a moderate crushing strength is required, or may be added in excess, approximately 15% being used when it is desired to produce a very readily powdering product.

The molasses slop, after being concentrated, is then ready to be dehydrated and retorted, for which purpose the apparatus disclosed in the referred to application may be employed. The dehydration of the molasses slop is preferably carried out at a temperature below that at which the molasses slop may be charred in order, when desired, to increase the density of the finished product. Thus, the dehydration of the molasses slop is carried out at a temperature of not over 140° C. since above this temperature charring of the material will take place.

Subsequent to such dehydration process, the temperature of the dehydrated material is raised to above 140° C. but not over 325° C. and the material is retorted at this temperature to drive off low volatile products, the temperature employed differing in range depending upon the density desired in the final product. Temperatures of over 325° C. are not utilized, since certain valuable constituents in the final product would thereby be driven off or destroyed.

These constituents are the nitrogen containing constituents which it is an object of the invention to convert into a form of fertilizer and hence, temperatures in excess of 325° C. substantially affect the operation of the process. The charring of the organic matter should take place at a temperature above 140° C., inasmuch as between this temperature and the temperature of 325° C., the most desirable swelling of the organic matter takes place, producing the proper characteristics in the finished product.

If it is desired to produce an intensely dense product, further molasses slop may be added to the contents of the retort during or after the completion of the retorting of the initial contents, with the result that such added material will be dehydrated and charred within the pores of the original charred product, increasing its density.

It is also possible to increase the density of the charred product obtained in the retort by the addition of previously dried molasses slop to the concentrated molasses slop as it is fed into the retort. A further control over the density of the finally produced charred product may be effected by varying the pressure upon the retort; thus, the application of pressures above atmospheric pressures to the retort results in an increase in the density of the final product, whereas reduced pressures maintained on the retort during the retorting operation decrease the density of the final product.

In some cases the sediment produced by the neutralizing of the molasses slop is removed before retorting, in order that the retarding influence of such sediment on the expansion of the slop during dehydration and retorting may be eliminated.

While the process of retorting or producing charred products from waste organic matter herein described is well suited for accomplishing the objects of the present invention, it is understood that various modifications in the details of the process may be made without departing from the spirit of the invention, and the invention includes all such modifications and changes as come within the scope of the appended claims.

I claim:—

1. A method of producing charred products from aqueous solutions and suspensions of saccharide nitrogenous organic matter, which comprises retorting the organic matter at a temperature between 140° C. and 325° C. and adding further similar organic matter to the charred product, and charring said added organic matter at a temperature between 140° C. and 325° C.

2. A method of producing charred products from aqueous solutions and suspensions of saccharide nitrogenous organic matter, which comprises neutralizing the organic matter, charring the same at a temperature between 140° C. and 325° C., and adding further similar organic matter to the material, then charring such further organic matter at a temperature between 140° C. and 325° C.

3. A method of producing charred products from aqueous solutions and suspensions of saccharide nitrogenous organic matter, which comprises neutralizing the organic matter, removing the organic sediment produced thereby, dehydrating the neutralized organic matter at a temperature below 125° C., then charring the same at a temperature between 140° C. and 325° C., and adding further similar organic matter to the charred product and charring such further organic matter.

4. A method of producing charred products from aqueous solutions and suspensions of saccharide nitrogeneous organic matter, which comprises neutralizing the organic matter and charring the organic matter at a temperature between 140° C. and 325° C., and at a pressure substantially above atmospheric.

5. A method of producing charred products from aqueous solutions and suspensions of saccharide nitrogenous organic matter which comprises, controlling the properties of the final product by adding the neutralizing agent in varying amount to the organic matter before concentration of the liquor, then dehydrating the organic matter at a temperature not over 125° C., charring the organic matter at a temperature between 140° C. and 325° C., and feeding further similar organic matter to the charge during the charring operation.

GUSTAVE T. REICH.